UNITED STATES PATENT OFFICE.

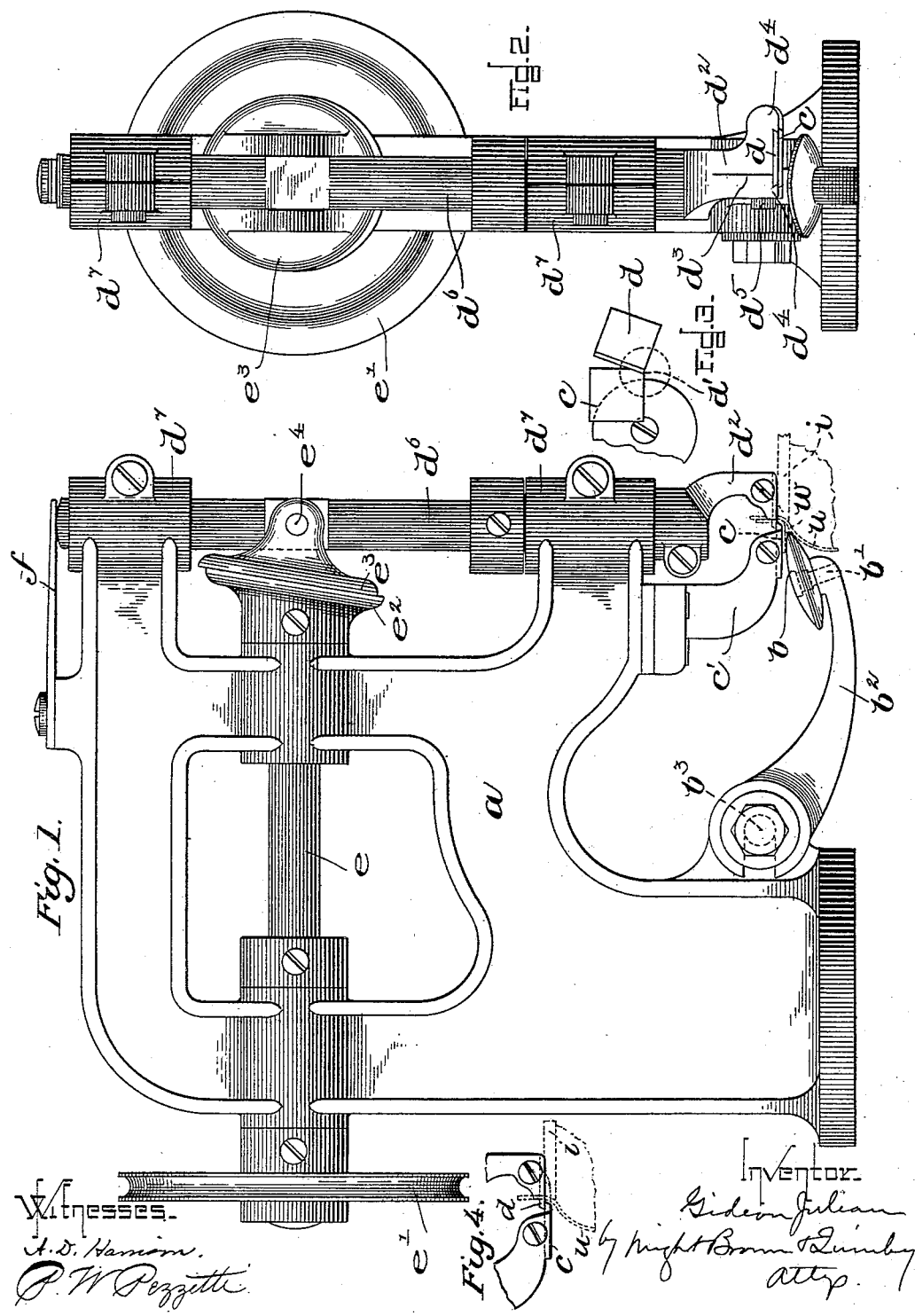

GIDEON JULIAN, OF BOSTON, MASSACHUSETTS, ASSIGNOR, BY DIRECT AND MESNE ASSIGNMENTS, TO CHARLES F. BROWN, TRUSTEE, OF READING, MASSACHUSETTS.

INSEAM-TRIMMING MACHINE.

SPECIFICATION forming part of Letters Patent No. 623,313, dated April 18, 1899.

Application filed January 12, 1898. Serial No. 666,450. (No model.)

*To all whom it may concern:*

Be it known that I, GIDEON JULIAN, of Boston, in the county of Suffolk and State of Massachusetts, have invented certain new and useful Improvements in Seam-Trimming Machines, of which the following is a specification.

This invention relates to machines for trimming off surplus material from boots and shoes, such as the surplus edges of the upper and welt, prior to the attachment of the outer sole to the welt, and has for its object to provide a simple and effective machine of this character.

The invention consists in the improvements which I will now proceed to describe and claim.

Of the accompanying drawings, Figure 1 represents a side elevation of an inseam-trimming machine embodying my invention. Fig. 2 represents an end elevation of the same. Fig. 3 represents a top plan view showing the relative arrangement of the work-rest and the trimming-knives or shear-blades. Fig. 4 represents a view similar to a portion of Fig. 1, the work-rest being removed.

The same letters of reference indicate like parts in all the figures.

In the drawings, $a$ represents a supporting-frame, which may be of any suitable form.

$b$ represents a rest adapted to enter the crease between the welt $w$ and upper $u$ of a welted boot or shoe, said welt and upper and the inner sole $i$ being shown in dotted lines in Fig. 1. The rest $b$ is preferably a disk mounted to rotate loosely on a stud $b'$, affixed to an arm $b^2$, which is adjustably connected to the frame $a$ by means of a bolt $b^3$, which is adapted to secure the arm $b^2$ adjustably and permit the rest $b$ to be raised or lowered by swinging the arm $b^2$ upwardly or downwardly, the arm being rigidly secured when the machine is in operation. The rest $b$ is preferably reduced to a thin edge at its margin to fit the welt-crease, as indicated in Fig. 1.

$c$ and $d$ represent shear-blades, one of which is fixed, while the other is movable and adapted to oscillate, said blades being arranged to coöperate in trimming off the surplus portions of the welt and upper, leaving the edges of said parts substantially flush with the outer surface of the inner sole. The blade $c$, which is fixed, is attached to an arm $c'$, rigidly mounted on the frame $a$, and is located over the rest $b$ in position to bear upon and support the outer surface of the body of the welt. The blade $d$, which is movable, has an oscillating movement, the center of oscillation being at the point $d'$, Fig. 3. Said blade $d$ is here shown as affixed to an arm $d^2$, having provisions for detachably securing the blade $d$, the arm being split at $d^3$ and having dovetailed shoulders $d^4$ $d^4$, which are clamped against the edges of the blade $d$ by a screw $d^5$. The arm $d^2$ is affixed to a rock-shaft $d^6$, which is journaled in bearings $d^7$ $d^7$ on the frame $a$. Means are provided for rocking or oscillating the shaft $d^6$ in its bearings, said means, as here shown, comprising a shaft $e$, journaled in bearings on the frame $a$ and driven by power applied in any suitable way, as by a belt running on a pulley $e'$, affixed to said shaft. To one end of the shaft $e$ is affixed a collar $e^2$, having a flat diagonal face, which bears against a corresponding flat face on a disk $e^3$, which is pivoted at $e^4$ to the rock-shaft $d^6$. The faces of the collar $e^2$ and disk $e^3$ bear loosely against each other, and the diagonal arrangement of the face of the collar $e^2$ causes the rotation of said collar to impart an oscillating movement to the disk $e^3$ and rock-shaft $d^6$, thus oscillating the blade $d$, one end of which is in the plane of the axial center of the rock-shaft $d^6$, said axial center being the point $d'$. (Shown in Fig. 3.)

The rock-shaft $d^6$ preferably has a longitudinal movement in its bearings and is pressed by a spring $f$ toward the fixed shear-blade $c$, this yielding pressure compensating for wear of the blades and keeping them in operative contact.

It will be seen that when the work is engaged with the rest $b$ the surplus edges of the welt and upper will project between the blades $c$ and $d$ and that the described movement of the blade $d$ will cause said blades to coöperate in trimming off the projecting material. It will also be seen that the arrangement of the fixed blade shown and described, whereby its under or outer side serves as a bearing or support for the adjacent part of the work, enables the fixed blade to act as a gage for determining the height of the trimmed edge, the distance between the latter and the part of the work that bears against the outer side of the fixed blade being equal to the thickness of said blade.

The rest $b$ may be dispensed with in trimming the surplus edge of the upper of a turned boot or shoe which has no welt, the upper being held by the operator against the outer face of the fixed blade, as shown in Fig. 4.

I claim—

1. A seam-trimmer comprising a fixed shear-blade, a shear-blade arranged to oscillate on an axis at a right angle to the plane of its cutting edge to coöperate with the fixed shear-blade as described, the fixed blade having its outer side arranged as a bearing-face or support for the work, so that the thickness of the fixed blade determines the height of the trimmed edge, and means for operating the oscillatory blade.

2. A seam-trimmer comprising a fixed shear-blade, an oscillatory shear-blade arranged to coöperate therewith as described, the fixed blade having its outer side arranged as a bearing-face or support for the work, so that the thickness of the fixed blade determines the height of the trimmed edge, means for operating the oscillatory blade, said means having provisions for permitting a movement of the oscillatory blade toward and from the fixed blade, and means for exerting a yielding pressure on the oscillatory blade to hold it against the fixed blade.

3. A seam-trimmer comprising a fixed shear-blade having an outer work-supporting face, a rock-shaft having a shear-blade arranged to coöperate with said fixed shear-blade, means for rocking said shaft to oscillate its blade, said means having provisions for permitting a longitudinal movement of the rock-shaft, and means for exerting a yielding pressure on the rock-shaft to press its blade against the fixed blade.

4. A seam-trimmer comprising a rest formed to enter the welt-crease and guide the work, a fixed shear-blade adjacent to said rest, a rock-shaft having a shear-blade arranged to coöperate with said fixed shear-blade, means for rocking said shaft to oscillate its blade, said means having provisions for permitting a longitudinal movement of the rock-shaft, and means for exerting a yielding pressure on the rock-shaft to press its blade against the fixed blade.

In testimony whereof I affix my signature in presence of two witnesses.

GIDEON JULIAN.

Witnesses:
C. F. BROWN,
A. D. HARRISON.